United States Patent [19]

Troletti

[11] Patent Number: 4,714,968
[45] Date of Patent: Dec. 22, 1987

[54] DIGITAL APPARATUS FOR DATA RECOVERY SYSTEM

[75] Inventor: Bonifacio Troletti, Boario Terme, Italy

[73] Assignee: Honeywell Information Systems Italia, Caluso, Italy

[21] Appl. No.: 835,415

[22] Filed: Mar. 3, 1986

[30] Foreign Application Priority Data

Mar. 21, 1985 [IT] Italy ............................ 20007 A/85

[51] Int. Cl.⁴ ............................................ G11B 5/09
[52] U.S. Cl. .................................... 360/51; 360/42; 360/43
[58] Field of Search ................. 378/51, 57; 360/43, 360/46, 51

[56] References Cited

U.S. PATENT DOCUMENTS 4,245,264 1/1981 Allen ...................................... 360/45
4,281,356 7/1981 Sousa ..................................... 360/45

Primary Examiner—Vincent P. Canney
Attorney, Agent, or Firm—Faith F. Driscoll; John S. Solakian

[57] ABSTRACT

A digital apparatus for data recovery system wherein data is recorded in FM or MFM code on magnetic media, comprises a measuring unit that in correspondence of a read pulse n as an input, supplies as an output, information related to the actual duration of interval N between pulse n and the previous read pulse n-1. A recovery unit for the magnetic media speed error relative to a nominal speed corrects the duration according to a code representative of the magnetic media speed error and a peak shift recovery unit which, according to the peak shift of pulse n-1, determined on the basis of the time history of the most recent pulses n-2, n-3, n-1 and the corrected duration, supplies as an output, nominal duration information related to this corrected duration and information representative of the direction and the amount of the peak shift of said read out pulse N-7. A measuring unit of speed error defines a code representative of the error as a function of the peak shift direction of a suitable number of subsequent read out pulses and a previously measured speed error which is fed to the speed error recovery unit. The nominal duration information is applied to the input of a logic unit for generating a "window" signal and reconstructing the read pulse in suitable phase relationship with the window signal.

3 Claims, 5 Drawing Figures

DIGITAL APPARATUS FOR DATA RECOVERY SYSTEM

BACKGROUND OF THE INVENTION

1. Field of Use

The present invention relates to digital apparatus for recovering binary information recorded on magnetic media, such as disk, diskettes, tapes.

2. Prior Art

Among the methods of recording binary information on magnetic media, the most frequently used are frequency modulation (FM) also known as single density and modified frequency modulation (MFM) or double density. Successively read out binary 1 or 0 bits recorded in FM are identified by the presence or absence, respectively, of a pulse in the center of contiguous recorded cells. Each cell is defined by two timing pulses. The first one defines the beginning of the cell and the second one defines the beginning of the subsequent cell. The time interval of a cell varies according to the media used. For instance, in the case of an 8-inch diskette and FM recording, the cell has a nominal length of 4 microseconds. Therefore, the nominal time intervals between two subsequent pulses may be 2 microseconds or 4 microseconds. In the case of 5¼ inch diskette, the nominal length of a cell is generally 8 microseconds.

In the case of MFM recording, successively read out binary 1 or 0 bits are also identified by the presence or absence, respectively, of a pulse in the center of contiguous cells. However, MFM recording differs from FM recording in that the timing pulse, defining the beginning of a cell, is absent when a pulse representative of a binary 1 information is present in the center of such cell or in the preceding one. For MFM also, the time interval of the cell depends on the recording media. For instance, in case of an 8-inch diskette and MFM recording, the nominal length of the cell is 2 microseconds. Therefore, the nominal interval time between two subsequent pulses can be 2, 3 or 4 microseconds. In the case of a 5¼ inch diskette, the nominal length of a cell is generally 4 microseconds. Further information on FM or MFM recording methods can be found in the IBM document GA 21-9257-1 entitled, "IBM Two Side Diskette Original Equipment Manufacturers Information—Second Edition" dated Nov. 1977.

The pulse sequence read out from the magnetic media support is applied to an input of a recovery system which supplies to an output, the binary information related to the input pulse sequence. Such pulse sequence periodically includes a so-called synchronization field (generally of 6 or 12 bytes), containing a predetermined number of pulses corresponding to a plurality of contiguous cells in which all "1" information bits or all "0" information bits have been recorded. The synchronization field is used by the recovery system for locking in and for establishing if a pulse detected in the input is a timing pulse or a pulse representative of a recorded information bit. The recovery system is therefore able to correctly detect information recorded on the magnetic medium on the basis of the time interval between two subsequent pulses and the nature of such pulses.

Unfortunately, data recovery through only measurement of the time interval between subsequent pulses is not reliable, since such interval may present a substantial deviation from its nominal value resulting in the misinterpretation of the pulse sequence during the recovery phase. Such deviation results from two main causes. The first is due to speed changes in the magnetic media, that is, in the rotational speed tolerances of the motor which drives the magnetic media. The second is due to the so-called phenomenon of peak-shift of the recorded pulse. As it is well known in the art, such shift is primarily due to the mutual influence of adjacent pulses. As known, such shift can be considered zero only when the recorded pulse density is constant, that is, if the interval between subsequent pulses is always equal. Clearly, such situation does not exist in FM and MFM recording except for the synchronization field. Therefore, the recovery system needs apparatus to correct for the causes of such errors.

The most known of these apparatuses are those which make use of an analog phase lock oscillator. Digital phase lock circuits have been recently suggested. Among the phase lock circuits, the apparatus disclosed by European patent application No. 84107390.1 of June 22, 1984, published on May 15, 1985 with No. 0141028 which corresponds to U.S. Pat. No. 4,672,482, issued on June 9, 1987 can be considered as exemplary of the state of the art. According to such patent application, the problem of recovering digital information recorded on magnetic media is solved by providing circuits able to identify, through the measurement of the actual interval between subsequent pulses, the synchronization field which is not affected by peak-shift but only by a possible speed error, therefore establishing the speed error of the magnetic media relative to a nominal speed during a time interval comprising a suitable number of read out pulses. This information which is updated at each synchronization field detection, is used during the reading out of subsequent read out pulses to correct the interval measured between subsequent read out pulses, providing a measurement interval affected only by the peak-shift error of pulses n and n−1 defining the measured interval. This information is applied to a peak-shift recovery unit together with coded information (supplied in feedback by the same recovery unit) defining the amount and the direction of the peak-shift of read pulse n−1.

The deduction of the peak-shift of read pulse n−1 from the correct measured duration allows the calculation of the nominal duration of the interval N between read pulses n−1 and n and the amount and the direction of the peak-shift of pulse n. The peak-shift of pulse n is sent back to discriminate between the nominal duration of the subsequent interval N+1 and the peak-shift of the subsequent read pulse n+1 and so on. In practice, to avoid the propagation and the accumulation of measurement errors, the peak-shift recovery system supplies in feedback not the peak-shift measurement obtained by a difference between measurements, but an "equivalent" code representative of nominal and actual duration of a determined number of intervals between immediately preceding read pulses.

The approach disclosed by the mentioned patent application is extremely efficacious and provides a high discriminating capability, better than that offered by a number of analog circuits and by other digital circuits. It substantially follows a correction concept in two phases: a speed correction based on a precise speed measurement, speed being detected when peak-shift phenomena are missing, and a subsequent peak-shift recovery. However, this approach is inherently affected by a limitation. That is, it cannot be used when the variations in media speed occur with a frequency equal or higher than the speed measurement frequency. It has been further verified that in case of low cost disks or tape unit, particularly "disk drivers" for flexible diskettes with 5¼ inch diameters, speed swinging can occur with frequency of about 1 KHz and an amplitude of ±5+8% relative to the nominal speed. When speed swing of this frequency occurs, the operation of the discriminating apparatus disclosed by the mentioned application is seriously jeopardized.

It would be desirable to have a discriminating apparatus able to substantially offer the same performance as the apparatus disclosed by the mentioned application but also be able to operate with magnetic media subject to swings of up to 1 KHz. This is required to enable the generalized use of low cost actuating units.

SUMMARY OF THE INVENTION

The digital apparatus for magnetic media data recovery system of the present invention achieves this objective. It is based on the following considerations.

1. The peak-shift of subsequent read pulses is a phenomenon which does not cause error accumulation.

2. This fact, valid for the amplitude and the direction of the single peak-shift is statistically valid also for the direction of the single peak-shift.

In other words, for a suitable number of subsequent read pulses, the number of pulses affected by positive peak-shift is to be equal to the number of pulses affected by negative peak-shift.

3. It is possible to theoretically estimate and experimentally verify that in each number of subsequent read pulses, a condition of "worst case" exists which puts into relation the number of subsequent pulses and the maximum difference between the number of pulses affected by positive peak-shift and the one affected by negative peak-shift.

For an interval having a duration of 4, 6 or 8 microseconds, the worst case is given by the sequence of intervals having the nominal duration . . . 4, 6, 8, 4, 6, 8, 4, 6, 8, 4, 6, 8, . . . or . . . 8, 6, 4, 8, 6, 4, 8, 6, 4, 8, 6, 4, . . . . For instance, if 7 subsequent intervals are considered, the maximum difference between the number of positive and negative peak-shifts is 4.

4. The consequence is that if the measurement of the actual duration of the time interval between subsequent read pulses and the determination of the amount and direction of each pulse peak shift lead to the defining of a difference between positive and negative peak shift (that is in one direction and in the opposite one) higher than an established value. This means that the magnetic media is affected by speed error, and the speed excess or defect leads to the wrong identification of peak shifts in one direction as peak shifts in the opposite direction.

5. On the basis of such considerations, the apparatus of the present invention provides a correction of the actual duration of the intervals according to the speed difference indirectly measured by calculating, through an up/down counter, the difference between the number of positive and negative peak shifts detected on a fixed number of subsequent pulses which are periodically and cyclically updated with a frequency higher than 1 KHz. These and other features of the invention will appear clearer from the following description of a preferred embodiment of the invention and of an alternative embodiment with reference to the drawings.

DESCRIPTION OF THE PREFERRED EMBODIMENT

Figure 1:
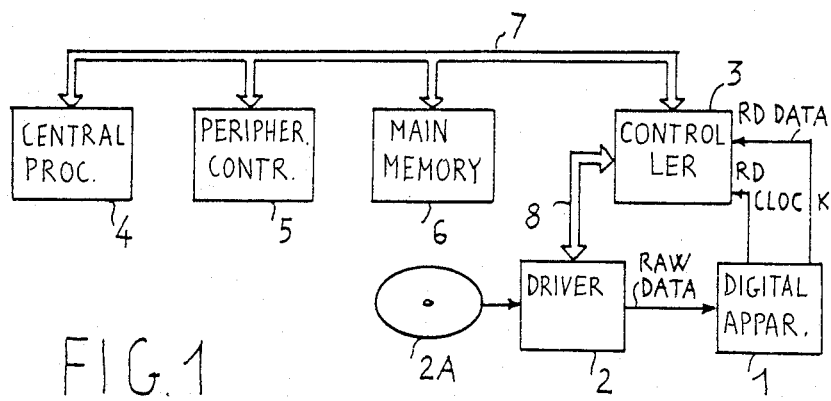
FIG. 1 shows in block diagram form a data processing system comprising the digital apparatus of the present invention.

FIG. 1 shows in block diagram form a typical data processing system comprising the digital apparatus of the present invention. Such apparatus, indicated by the reference number 1, is positioned between a drive device 2 for a mass storage 2A and a controller 3. The system of FIG. 1 further comprises a central processor 4, a peripheral controller 5 and a main memory 6. Central processor 4, main memory 6 and controllers 3 and 5 are connected to each other by means of a plurality of leads or system bus 7 through which data, addresses and control signals can be exchanged. In the present embodiment, an assumption is made that the system mass storage is provided with a 5¼ inch diskette and that drive device 2 is a disk driver. The consideration is that the following will be, however, valid for other kinds of storage devices too, as for example, magnetic tape storage.

In the present embodiment, where a mass storage is provided by a diskette, a standard circuit chip, such as the 1791 integrated circuit chip, manufactured by Western Digital Corporation, can be used as controller 3. Controller 3 and drive device 2 exchange a plurality of control and information signals through a channel or bus 8. A detailed description of the circuits and interface signals between controller 3 and device 2 has been omitted since it is not essential for an understanding of the present invention.

In the case of the embodiment of the present invention, a 5¼ inch diskette has been used for mass storage together with the 1791 integrated circuit chip manufactured by Western Digital as controller, the circuits and interface signals can be drawn from the specifications of such products. The same considerations are valid for the interface between controller 3 and recovery apparatus 1. It is only pointed out that the recovery apparatus 1 must supply controller 3 with a square wave signal RD CLK and with a pulse train RD DATA at logical level 0 with each pulse corresponding to a magnetic flux transition detected on the recording media. Pulses RD DATA and window signal RD CLK have only to fulfill the condition that each pulse RD DATA occurs entirely within a half wave (or window) of signal RD CLK.

For the rest, the pulse position relative to window signal RD CLK and the pulse length can be arbitrary. However, it is preferred that the length of a pulse RD DATA fall in the range of 100 to 250 nsec. and the delay of the beginning or end of a pulse relative to the transition of window signal RD CLK should be no longer than 40 nsec. Controller 3 does not need to be informed of whether each of the pulses RD DATA corresponds to a timing transition or to a data transition. The controller 3 is able to distinguish between such transitions from the pattern read out in response to the well known synchronization and "address mark" fields. Also, the period of the timing or window signal can be variable and each of the two signals half waves may have a different length.

Device 2 supplies digital apparatus 1 with a pulse RAW DATA in response to each detected magnetic flux transition. Since the disclosed system is intended to recover FM and MFM recorded information, the time intervals between subsequent pulses RAW DATA are indicative of such information. Apparatus 1, in response to the pulse train RAW DATA received as an input, supplies controller 3 with the window signal RD CLK and with the pulses RD DATA which correspond to the pulses RAW DATA suitably positioned relative to window signal RD CLK. Controller 3 is able by means of signal RD CLK to detect the information bits within the pulse train RD DATA and make them available in parallel form to system bus 7.

Figure 2:
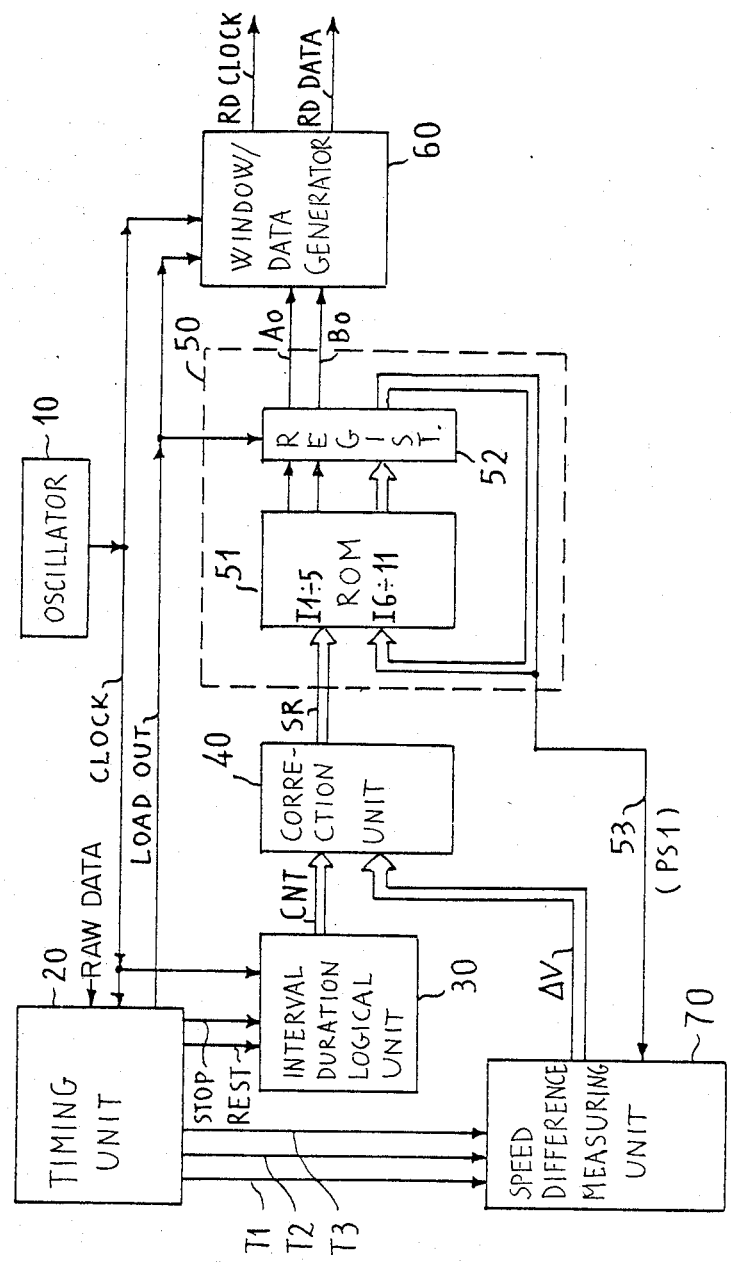
FIG. 2 shows in block diagram form the digital apparatus of the present invention.

FIG. 2 shows in block diagram form, the digital apparatus 1 of FIG. 1 which corresponds to the present invention. Apparatus 1 essentially comprises an oscillator 10, a timing unit 20, a logical unit 30 for measuring the interval duration between subsequent input pulses, a logical unit 40 for correcting such duration according to a speed difference relative to a preestablished speed, a logic unit 50 for the peak shift recovery and the discrimination of the nominal duration corresponding to each interval, a logic unit 60 for reconstructing the read pulse train RD DATA within a window signal RD CLK generated by unit 60 itself and a unit 70 for measuring and determining the speed difference relative to a preestablished speed. The reason why the measured speed error is referred to a preestablished speed instead of to the nominal speed will be later explained.

Oscillator 10 supplies units 20, 30 and 60 with a square wave signal CLOCK having a frequency of 8 MHz. Timing unit 20 is activated by each of the pulses RAW DATA and supplies a plurality of timing signals REST, STOP, T1, T2, T3, LOAD OUT, to units 30, 50, 60 and 70 in order to control and synchronize their operation. Specifically, signal LOAD OUT is sent to units 50 and 60 while signals REST and STOP are sent to unit 30 and signals T1, T2 and T3 are sent to unit 70.

Figure 3:
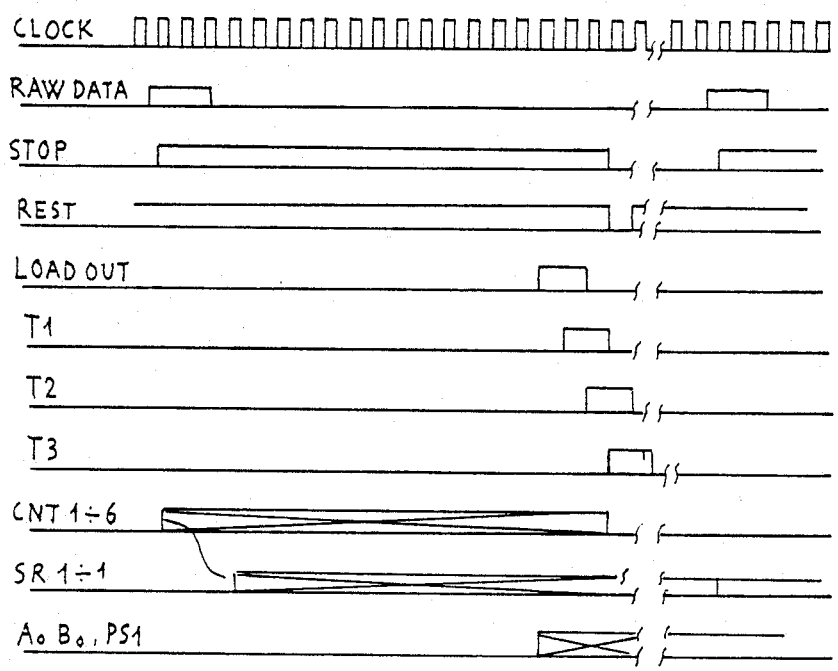
FIG. 3 shows a timing diagram depicting some signals present in the digital apparatus of FIG. 2.

Timing unit 20 can be constructed in several ways, with shift registers, delay lines. More particularly, it can be constructed with the same components and connections as the timing unit shown of the previously mentioned European patent application. Therefore any further description is unnecessary. For ease of understanding of the invention, reference is made to FIG. 3 which shows in timing diagram the signals generated by the oscillator 10 and by unit 20 together with other signals which will be later considered.

The diagram labeled CLOCK is representative of signal CLOCK generated by oscillator 10. The diagram labeled RAW DATA is representative of the read pulses received from unit 2. The read pulses appear as asynchronous events relative to signal CLOCK and at variable time intervals due to the magnetic media speed error and to the peak shift. With the rise of signal CLOCK, immediately subsequent to the rise of signal RAW DATA, signal STOP rises to a logical level 1 and is kept at a "1" for a duration of 19 CLOCK periods. When signal STOP falls to a logic 0 level, a signal REST, normally at a "1" falls to a "0" for a duration of one CLOCK period. Signals LOAD OUT, T1, T2 and T3, respectively, rise to logical 1 levels for a duration of two CLOCK periods after 16, 17, 18 and 19 CLOCK periods from the rising of signal STOP.

Figure 4:
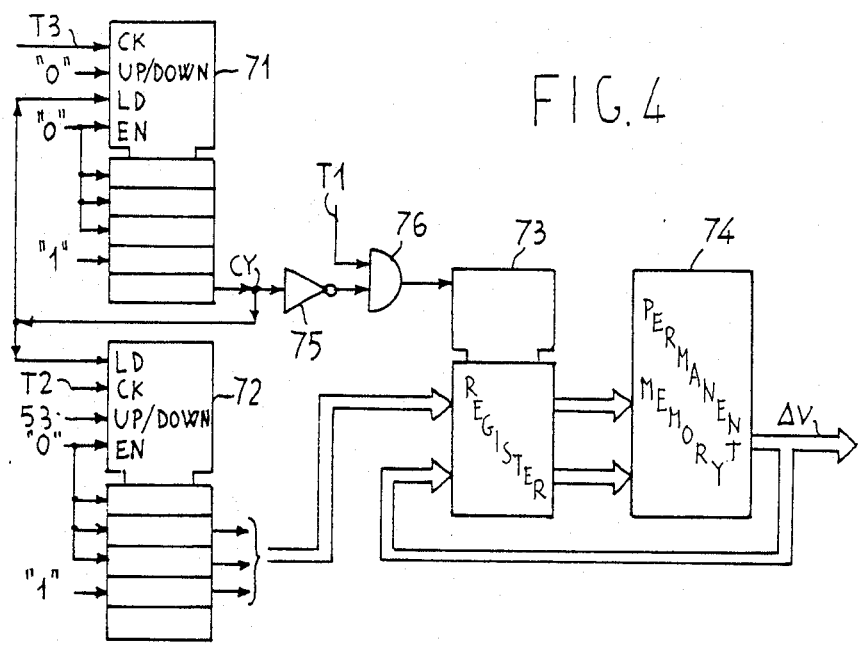
FIG. 4 shows in detailed form a preferred embodiment of a speed error measuring unit of the digital apparatus of FIG. 2.

The sequence is triggered by a RAW DATA pulse and, when the sequence is exhausted, unit 20 remains inactive until a new trigger pulse is received. Measuring unit 30 includes a six-bit binary counter (as for example two 4-bit integrated circuit counters such as shown in FIG. 4 of the already mentioned patent application) which is reset by signal REST at a logical 0 level and increments at each CLOCK pulse received on a clock input for the whole time signal STOP, applied to a control input, is at logical 0 level.

Counter 30 stops when signal STOP is at a logical 1 level. Counter/unit 30 supplies an output on a channel CNT a 6-bit binary code $CNT1 \div 6$ representative of the interval between the rising of two RAW DATA read pulses, expressed in the number of CLOCK periods, less a fixed duration equal to 20 CLOCK periods (that is: $20 \cdot 125 = 2500$ nsec). The measurement is affected by an uncertainty due to the asynchronous rising of RAW DATA pulses relative to the CLOCK pulses. The maximum value of such uncertainty is equal to two CLOCK periods; that is, 250 ns ($\pm 125$ nsec.). Counter 30 is therefore able to measure, with a resolution of 250 nsec., time intervals varying from 2500 nsec. to $2500 + 125 \cdot (2^6 - 1) = 10.375$ nsec. The binary code $CNT1 \div 6$ remains unchanged for the whole time that signal STOP is at logical 1 level. It is applied as an input to speed difference recovery unit 40 through channel CNT.

Unit 40 of FIG. 2 consists of a permanent memory having, for instance, a capacity of 2K bytes. Six address inputs of the memory are connected to channel CNT and the remaining five are connected to a channel $\Delta V$ which is an output from the 70. A binary code $\Delta 0-4$ is present on channel $\Delta V$ representative of the speed difference relative to the media nominal value. The memory acts as transcoder and changes the code $CNT1 \div 6$ received on channel CNT to a 5-bit code $SR1 \div 5$ representative of an interval duration between read pulses corrected in accordance with the code $\Delta 0 \div 4$, that is, without speed error. Code $SR1 \div 5$ is applied, through channel SR, to peak shift recovery unit 50.

As shown in FIG. 2, unit 50 includes a permanent memory 51, having for instance a capacity of 2K bytes and an 8-bit latch register 52. Memory 51 is provided with 11 address inputs $I1 \div 11$. Five of them, $I1 \div 5$ receive code $SR1 \div 5$. The remaining 6 inputs $I6 \div 11$ are connected to six of the eight outputs of register 52. The outputs of memory 51 are connected to the inputs of register 52. The information in output from memory 51 is loaded into register 52 when the register is enabled by the rising edge of periodic signal LOAD OUT.

As described in the already mentioned European patent application, peak shift recovery unit 50 operates as follows. Memory 51 is addressed by a code $SR1 \div 5$ representative of the measured actual duration $DE_N$, corrected as concerns a possible speed error within an interval N between two read pulses $n-1$ and n. It is further addressed by a 6-bit code feedback through register 52 representative in coded form of the value amount and direction (positive or negative) of peak shift $PS_{n-1}$ of read pulse $n-1$. In other words, remember that the nominal duration $DN_N$ of internal N differs from the duration DEN (corrected as concerns speed) due to peak shifts $PS_{n-1}$ and $PS_n$ of read pulses n−1, n which define interval N, that is:

$$DE_N = DN_N - PS_{n-1} + PS_n$$

wherein the quantity $D_N + PS_n$ is defined and the discrimination between the two components is made possible.

Memory 51 contains transcoding codes which perform such discrimination and, for each addressable position, that is, for each pair of information $DE_{N'\text{and }PSn-1}$, supply as an output the pair of information $DN_N$ and $PS_N$, that is, a 2-bit binary code $A_0$, $B_0$, specifying whether the nominal duration is 4, 6 or 8 microseconds, and a six-bit binary code PS 1÷6, specifying with a first bit PS 1, if the peak shift is positive or negative and with the remaining bits, the peak shift entity. The codes A0, B0 and PS 1÷6 are loaded into register 52 and from there respectively are sent to two inputs of unit 60 (code A0, B0) and to address inputs I6÷11 of memory 51. Further, a lead 53 connects an output of register 52 on which the information PS1 is presented to an input of unit 70.

It will be noted that peak shift recovery unit 50 is quite identical (apart from connection 53) to and operates in the same way as the corresponding peak shift recovery unit described in the mentioned European patent application so that any detailed description is not required. It is only to be pointed out that the transcoding codes recorded in memory 51, in this case, may represent the actually detected value/amount of peak shift PS and not information related to it (that is the actual duration of an interval $DE_N$ and the nominal duration $DN_N$ and $DN_{N-1}$ of the same interval or of the preceding one) as disclosed in the mentioned application. In fact, such artifice necessary to the mentioned application for avoiding the propagation and the accumulation of measurement errors, is not required in the apparatus of the present invention because, as later disclosed, unit 70 allows the recovery of such kind of error.

Logic unit 60 timed by signals CLOCK and LOAD OUT, supplies an output according to code A0, B0, a timing window signal RD CLK and a data signal RD DATA, which can be detected by controller (FIG. 1). Since logic unit 60 is identical to the one disclosed by the mentioned application and its description is unessential for the invention understanding, reference may be made to the previously mentioned application for its architecture and operation details.

With reference to FIG. 4, the speed error recovery unit 70 of the present invention will now be considered. Unit 70 comprises a first counter 71, a second bidirectional counter 72, a register 73, a permanent memory 74, a NOT logical element 75 and a two input logic AND gate 76. Counter 71, for instance, is of the type available on the market with part number 74LS169 is set for the cyclical counting of 8 pulses. For this purpose, its present inputs corresponding to binary positions 0, 2 and 4, and its enabling input EN are connected to a logical "0" level source while a preset input of binary position 8 is connected to a logic "1" level source. Input UP/DOWN is connected to a logic "0" level source in order to increment. Counter 71 has a carry output CY normally at a logical 1 level which falls to a logical 0 level when the counter reaches its maximum counting status. The CY output is connected to input LD of counter 71 and its clock input receives timing pulses T3 from unit 20. When input LD is at a logical 1 level, counter 71 increments at each rising edge of signal T3 applied to an input CK. When input LD is at logic 0 level, it is preset upon receipt of pulse T3 to a state established by the signals present on the present inputs. It is clear that counter 71 preset to a binary state corresponding to 8, reaches binary state 15 on receipt of seven T3 pulses, and at the reception of an eighth T3 pulse, it is preset again. Counter 71 operation is therefore cyclical with a period corresponding to the reception of 8 T3 pulses equal to 8 read intervals between read pulses.

Counter 72, the same type as counter 71, has its preset input of binary position 8 connected to a logic "1" while its preset inputs of binary positions 0, 2 and 4 and its enabling input EN are connected to a logic "0". Timing pulses T2, generated by unit 20, are applied to CLOCK input CK. Input LD is connected to the carry output CY of counter 71. Input UP/DOWN of counter 72 is connected to lead 53 and therefore periodically receives a signal indicating by its logic level, if the last detected peak shift was positive or negative.

It is therefore clear that counter 72 operates as follows. At the end of a counter cycle of counter 71 (CARRY=0), counter 72 is set into counting configuration of 8 at reception of a first T2 pulse and subsequently at reception of seven subsequent pulses T2, increments or decrements according to whether during the interval between such pulses the signal on lead 53 is "1" or "0", that is, according to whether the detected peak shift related to each of these intervals is positive or negative. With the eight T2 pulse subsequent to the first one, the counter is preset again to count configuration of 8. The state reached by counter 72 upon the reception of the seven T2 pulses therefore changes according to the number of negative or positive peak shifts.

In a period corresponding to seven read intervals, it is clear that only the following cases can occur which lead to the state of the counter. The cases are shown in the following table for simplicity sake.

| Peak Shifts | | | |
|---|---|---|---|
| Positive | Negative | Difference | Binary Status |
| 7 | 0 | +7 | 1111 |
| 6 | 1 | +5 | 1101 |
| 5 | 2 | +3 | 1011 |
| 4 | 3 | +1 | 1001 |
| 3 | 4 | −1 | 0111 |
| 2 | 5 | −3 | 0101 |
| 1 | 6 | −5 | 0011 |
| 0 | 7 | −7 | 0001 |

From this table, it clearly appears that the possible states reached by the counter are unequivocally established by the three most significant bits.

The three most significant outputs of counter 72 are connected to as many inputs of the latch register 73. The register is periodically loaded at the end of a counting cycle of counters 71 and 72 and before the counters are preset. To this end, loading input LD of counter 73 is connected to the output of AND gate 76 which receives at a first input, timing signal T1 and at a second input, signal CY through NOT element 75. Besides binary information representative of the counting status of counter 72, binary information $\Delta$ V1÷5 representative of the speed error of the magnetic media relative to the nominal speed is also loaded into register 73. The outputs of register 73 are connected to as many address inputs of permanent memory 74 which, acting as transcoder, generates binary code $\Delta V1 \div 5$ as an output on channel $\Delta V$. This code is feedback to the inputs of register 73 as well as to the corresponding address inputs of memory or speed error correction unit 40, as already explained.

Unit 70 operates in a conceptually simple way. First of all, it will be noted that unit 70 generates as an output, a speed error code $\Delta V$ defining an actual speed of the magnetic media $$VE = VN + \Delta V$$

where
VE = actual speed
VN = nominal speed and
$\Delta V$ = speed error.

This information is used to correct the measured duration of the intervals between read pulses. Therefore, the corrected duration is affected by peak shift error only. On the other hand, in such a situation, the peak shifts of the several pulses cannot accumulate. That is, on average, during a certain number of subsequent read intervals, the peak shifts detected for the several read pulses must be positive and negative in equal number; that is, their numerical difference must be zero or very near to zero.

The consequence is that, if during a certain number of intervals between read pulses, in spite of the effected speed correction, the difference between positive and negative peak shifts (as detected by counter 72 and in the following referenced with $\Delta PS$) is different from 0, the effected speed correction is not adequate and a speed error is still present. The pair of information $\Delta PS$ and $\Delta V$ is used to address memory 74 to a location generating as an output a new speed error code $\Delta V'$ compensating for such inadequacy. It is clear that this compensation process also recovers possible error accumulation due to the discrete nature of the duration measurement.

The compensation process takes place in a continuous periodic way with the updating of speed error $\Delta V$ at each period consisting of 8 intervals between subsequent read pules; that is, in the worst case of intervals with a nominal duration of 8 microseconds and a speed difference in defect of 10% each 70 microseconds, corresponding to a minimum frequency of 14 Hertz. This frequency is much higher than the speed variation frequency of the magnetic media. The relationship between the pair of information $\Delta PS$, $\Delta V$ and the new updated code $\Delta V'$ can be widely chosen. In practice, to secure stability to the conceptual implemented control loop, it is suitable that the gain of the loop be lower than 1; that is, the correcting action not be higher than the cause giving rise to it, and that new value $\Delta V'$ differ from the previous one only for values of $\Delta PS$ equal to $\pm 5$, $\pm 7$. The relation may even be non-linear. For instance, if code $\Delta V$ consists of 5 bits and can assume 32 different values representative of speed errors in a range of $\pm 12\%$ (as to the nominal speed) and differ one from the other in multiples of an elementary quantity equal to about 0.8%, it can be imposed that if $\Delta PS = \pm 5$, $\Delta V'$ differs from $\Delta V$ of $\pm 1.6\%$ and if $\Delta PS = \pm 7$, $+V'$ differs from $\Delta V$ of $\pm 3.2\%$. This means that a speed variation or error of 10%, to be integrally recovered, requires three measurement periods; that is, in the worst case 210 microseconds, shorter than the wave quarter period of a speed variation with frequency 1 KHz.

Figure 5:
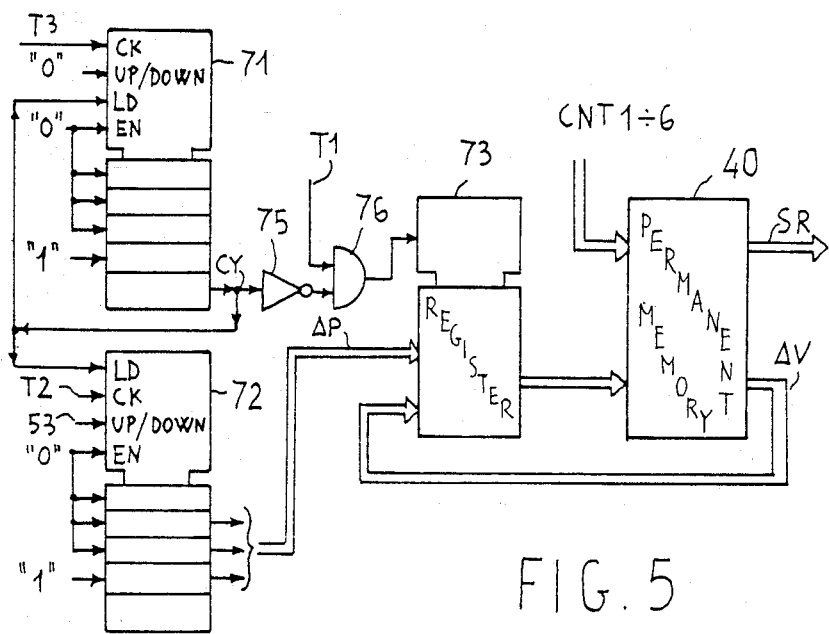
FIG. 5 shows in detailed form an alternative embodiment of speed error measuring unit and a speed error correction unit for the digital apparatus of FIG. 2.

FIGS. 2 and 4 show a preferred embodiment of the apparatus of the present invention. Several changes can be made without departing from the scope of the invention. FIG. 5 shows a possible variation which can be used to minimize the number of permanent memories which are used. Particularly, it shows unit 70 and unit 40, the other elements of the apparatus remaining unchanged. In this case, memory 74 of FIG. 4 is substituted by memory 40 in operation. Register 73 latches code $\Delta P$ generated by counter 72, together with code $\Delta V$; in this case, a three-bit code representative of the previously measured speed error.

The outputs of register 73 are connected to corresponding address inputs of memory 40 receiving code $CNT1 \div 6$ on the other address inputs. Memory 40, according to the address codes, generates as an output a code $SR1 \div 5$ with duration corrected as to the speed error and a new three-bit code $\Delta V'$ representative of a new speed error updated according to code $\Delta PS$. It is clear that in this case, the capacity of memory 40 must be 4 K bytes and that the speed error $\Delta V'$ is expressed with a lower resolution as to the one which can be obtained in the previously mentioned case. However, it has been experimentally verified that this lower resolution does not substantially hamper the performances of the apparatus, and that in that case, a two-bit code is used to express speed error $\Delta V'$ (with consequent reduction of the memory capacity to 2 K bytes) satisfactory performances are still obtained. The same considerations can be applied to code $\Delta PS$ which can consist of only two bits instead of three bits, by cutting the peak shift counting to a lesser number of intervals, for instance 3 or 5. If the number of counted peak shifts is 3, it is clear that $\Delta PS$ can assume values $+3, +1, -1, -3$ which can be represented with a 2-bit code. If the number of counted peak shifts is 5, $\Delta PS$ can clearly assume values $+5, +3, +1, -1, -3, -5$. With a suitable preset of counter 72 and with a suitable choice of the output bits, values $+3, +1$ can be represented with the same code and values $-1, -3$ with another code, therefore assigning to values $\Delta PS = \pm 3 \pm 1$, the same correcting function (minimum or nul in absolute value) and to values $\Delta PS \pm 5$ a higher correcting function. It is also possible to increase the correction system resolution by increasing the number of bits constituting information $\Delta PS$ or $\Delta V$ and consequently increasing the capacity of permanent memory 74 (FIG. 4) or 40.

What is claimed is:

1. Digital apparatus for a data recovery system wherein the data is read out from a moving magnetic media and is affected by a speed error and by peak shift, said system comprising a unit for measuring the duration of intervals between first and second subsequently read out pulses, a speed correcting unit for converting the measured duration of said intervals into a duration corrected for errors in speed, a peak shift recovery unit for generating signals identifying, depending on the peak shift of a first pulse and the corrected duration of a following interval, a nominal duration of said following interval and the peak shift of the second pulse ending said following interval, said digital apparatus comprising:

means for receiving a binary signal representative of the peak shift direction of each subsequent read out pulse;

a first counter for counting a preestablished number of subsequent read out pulses;

a second counter coupled to said first counter to receive said binary signal to effect the algebric sum of the peak shift direction of said preestablished number of read out pulses and to generate a binary code representative of peak shift difference; and, circuit means having outputs and inputs coupled to receive said binary code from said second counter and a speed error code fed back from said outputs which is representative of a previously measured speed error, said circuit means generating a new, updated speed error code, as a function of said binary code and said previously generated speed error code, said circuit means including means connected to said outputs for applying said updated speed error code to said speed error correcting unit and to said inputs of said circuit means.

2. The digital apparatus of claim 1 wherein said circuit means further comprises:

a latching register having inputs and outputs, said inputs being coupled to be periodically loaded with said binary code and said previously measured speed error code, and an addressable memory having a first plurality of locations containing first transcoding codes, first outputs and first address inputs connected to said outputs of said register, said memory being operative to generate a new updated speed error code on first outputs.

3. The digital apparatus of claim 2 wherein said memory has second address inputs for receiving a code representative of a measured interval duration, second outputs and a second plurality of locations for storing second transcoding codes, said memory being operative to generate on said second outputs, a corrected interval duration code used for speed error correction and for generating a new updated speed error code.

* * * * *